United States Patent [19]

Momoi et al.

[11] 4,200,013

[45] Apr. 29, 1980

[54] AUTOMATIC SUPPLY DEVICE FOR BAR STOCKS FOR LATHE

[75] Inventors: Shoji Momoi; Yukio Mitsuguchi, both of Niwa, Japan

[73] Assignee: Kabushiki Kaisha Yamazaki Tekkosho, Niwa, Japan

[21] Appl. No.: 905,522

[22] Filed: May 5, 1978

[30] Foreign Application Priority Data

May 18, 1977 [JP] Japan ................................. 52-57417

[51] Int. Cl.$^2$ .............................................. B23B 13/00
[52] U.S. Cl. ....................................................... 82/2.5
[58] Field of Search ............................................ 82/2.5

[56] References Cited

U.S. PATENT DOCUMENTS

| 1,226,303 | 5/1917 | Brightman | 82/2.5 |
| 1,978,060 | 10/1934 | Rickert | 82/2.5 X |
| 2,316,117 | 4/1943 | Tilley | 82/2.5 X |
| 3,009,617 | 11/1961 | Brown | 82/2.5 |

FOREIGN PATENT DOCUMENTS

| 808663 | 7/1951 | Fed. Rep. of Germany | 82/2.5 |
| 876634 | 5/1953 | Fed. Rep. of Germany | 82/2.5 |
| 46985 | 10/1918 | Sweden | 82/2.5 |

*Primary Examiner*—Harrison L. Hinson
*Attorney, Agent, or Firm*—Wenderoth, Lind & Ponack

[57] ABSTRACT

The present invention relates to a lathe to which a long bar stock is automatically supplied by a simple construction utilizing the revolution of a main spindle. Pinch rollers having a hyperboloidal profile are disposed face to face and a circumferential surface of a bar stock is pinched by the pinch rollers. The pinch rollers each have a driving roller concentric therewith and are rotated as one unit. The distance between the opposed pinch rollers can be adjusted to correspond to the diameter of the bar stock. The driving rollers are rotated by rotation of the main spindle for feeding the bar stock in the axial direction by the resulting rotation of the pinch rollers.

3 Claims, 4 Drawing Figures

AUTOMATIC SUPPLY DEVICE FOR BAR STOCKS FOR LATHE

BACKGROUND OF THE INVENTION

Heretofore devices have existed for the automatic supply of bar stock for a lathe, an automatic lathe and so forth. In one device the bar stock is automatically supplied by pushing it from the rear end after inserting it into a hole in the main spindle by a push rod connected to a counterweight. In a second device the bar stock is automatically supplied by pushing it from the rear end by a hydraulic cylinder. In a third device the bar stock is automatically supplied by a feed finger which is disposed in the hole of the main spindle. Other various methods exist. In the first device in which the push rod is used, the bar stock is always pushed by the push rod from the back so that a compressive force acts on the said bar stock, therefore; in case of a slender bar stock, there is a drawback that precision in cutting is poor because of the occurrence of vibration due to revolution while the bar stock is in the bent condition. In the second device in which a hydraulic cylinder is employed, a hydraulic unit is needed and its cost is very high, and moreover, some restriction exists on the length of the bar stock. In the third device in which the feed finger is employed, there is a drawback that there is some restriction on the largest diameter of the bar stock because it is necessary to provide the feed finger within the hole of the main spindle and the automatic supplying of bar stock of a comparatively large diameter can not be accomplished.

BRIEF SUMMARY OF THE INVENTION

The first object of the present invention is to provide means for automatic supplying of bar stock in a lathe in which cutting can be carried out in a stabilized condition by controlling the occurrence of vibration without any compressive force on the bar stock in the axial direction regardless of the diameter of the workpiece.

The second object of the present invention is to provide means for automatic supplying of bar stock of any diameter by freely adjusting the distance between the pinch rollers and the direction of the pinch roller which are positioned face to face.

The third object of the present invention is to provide means for automatic supplying of bar stock which does not impose any restrictions on the length of the bar stock.

The fourth object of the present invention is to provide a low manufacturing cost feed mechanism utilizing the rotational force of the main spindle.

Other purposes and features of the present invention will be easily understood from the description below and the accompanying drawings.

DETAILED DESCRIPTION OF THE INVENTION

Figure 1:
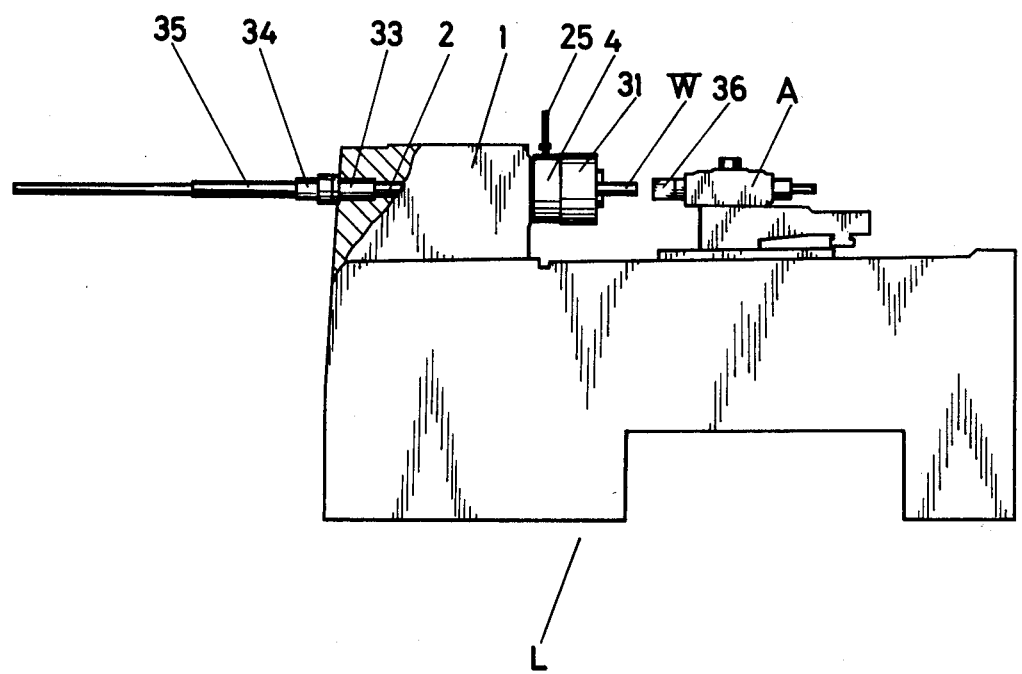
FIG. 1 is an elevation view of a lathe provided with the device of the present invention.
Figure 2:
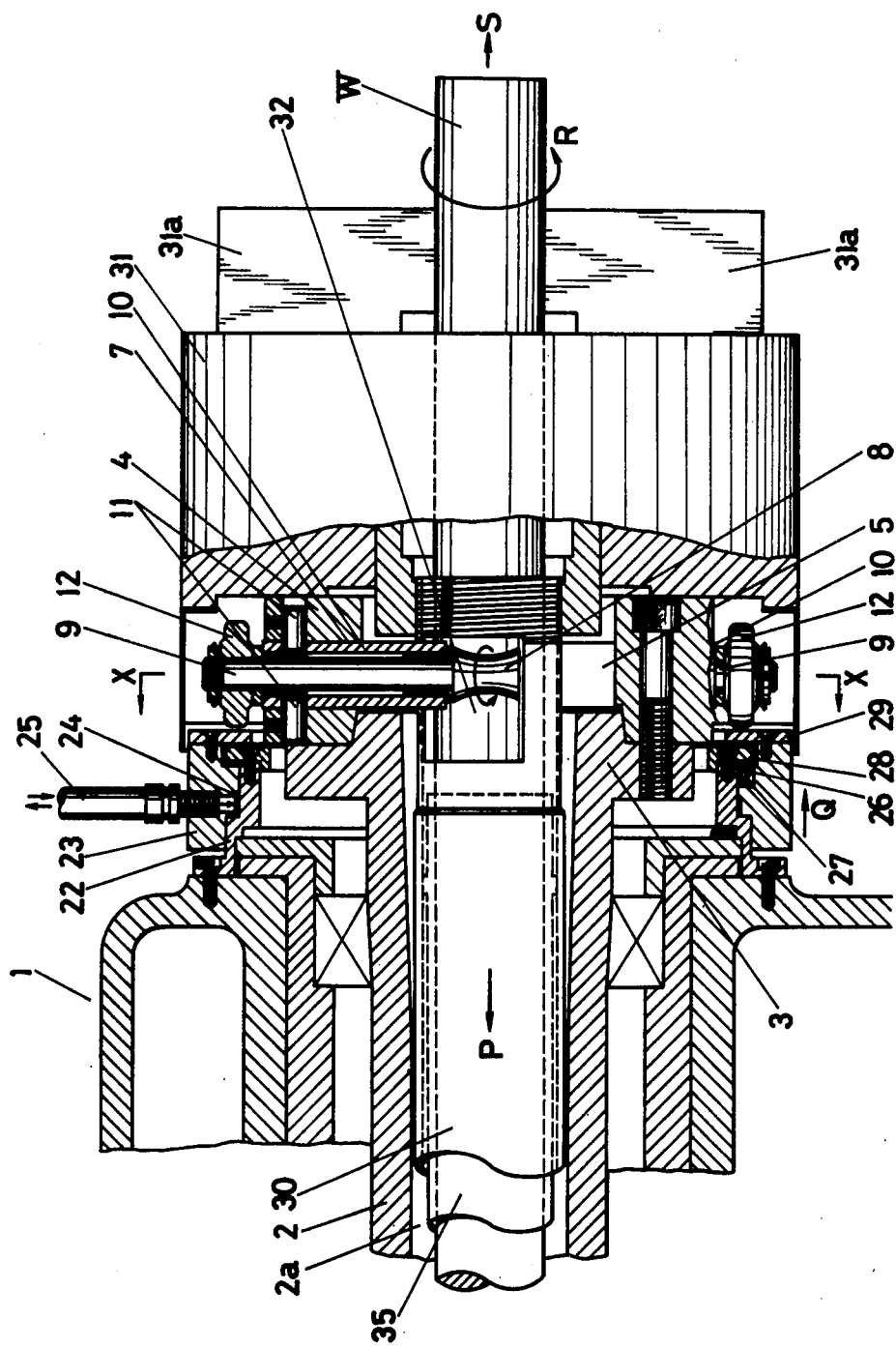
FIG. 2 is a partial axial section of the device of FIG. 1.
Figure 3:
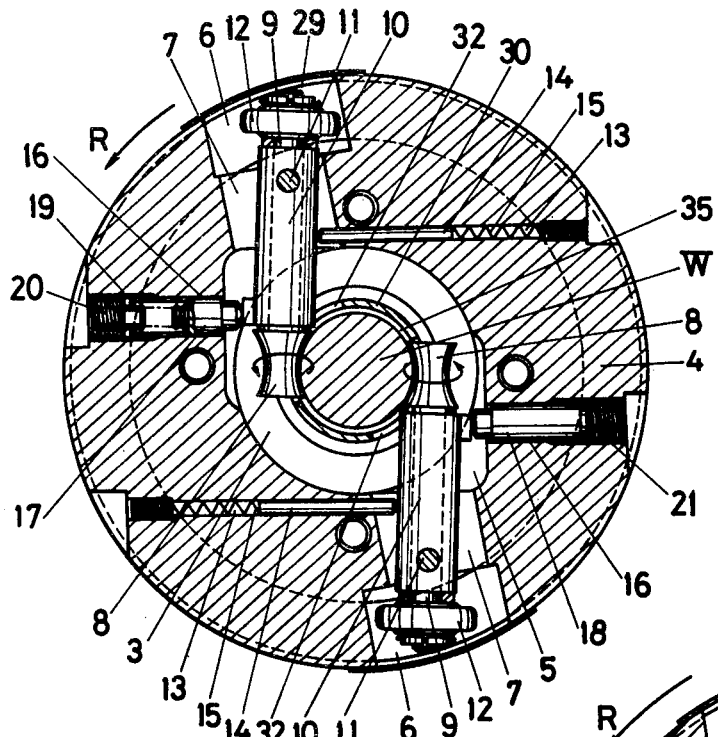
FIG. 3 is a sectional view on line in FIG. 2.

In FIGS. 1 to 3, a main spindle 2 is supported rotatably on a headstock 1 of a lathe L and at the end 3 thereof a main body 4 of a supply device is positioned. The main body 4 has a disc shape and a hole 5 therethrough at the center of the spindle, and further has a pair of grooves 6 which are at diametrically opposite points on the outer circumferential surface and a slot 7 extends inwardly from each of the respective grooves 6 into the hole 5. There is rotatably inserted into each of two tubes 10 a respective shaft 9 at one end of which is a pinch roller 8 with a concave profile having a radius of curvature to correspond to the outer circumferential surface of a workpiece material W and the tubes 10 are positioned in the slots 7 in the main body 4 with the pinch rollers 8 in spaced opposed positions on opposite sides of the longitudinal axis of spindle 2. Each tube 10 is pivotally mounted on a pin 11 for movement of the rollers 8 toward and away from each other, and a driving roller 12 is mounted at the other end of each shaft 9. A small pin hole 13 extends into each slot 7 from the outer circumferential surface of the main body 4, and a pin 14 is inserted freely displaceable in the axial direction in the hole 3 and a compression spring 15 is provided for urging the pin 14 against the middle of the tube 10. A small hole 16 extends into the tube 10. Having a small pin hole 16 bored and penetrated to the through hole 5 from the outer circumferential surface of the main body 4 at a position corresponding to the inner end of each tube 10, and pins 17 and 18 are freely displaceable in the respective holes 16 in the axial direction and engaged with the outer circumferential surface of the tube 10. Behind the pin 17 is a number of belleville springs 19 and the resiliency is adjusted by an adjusting screw 20 in the outer end of the hole 16. The tip end of pin 18 is engaged with the outer circumferential surface of the tube 10 and is pressed by an adjusting screw 21. An inner tube 22 is attached to the headstock 1 and an outer tube 23 is freely displaceable on the said inner tube 22 in the axial direction. The inner tube 22 and the outer tube 23 define an air chamber 24 therebetween and an air hose 25 opening into the air chamber 24 is connected to a pressure source and is attached to the outer tube 23. On the end surface of the outer tube 23 there is disposed a number of small holes 26 and a compression spring 27 is resiliently provided in each hole. To the end part of the inner tube 22 there is attached a press plate 28. A ring plate 29 is attached to the end surface of the outer tube 23 and engages the driving rollers 12 when the outer tube 23 is displaced to the right in FIG. 2. In a main spindle hole 2a there is fitted a draw tube 30 which spirally engages a hydraulic chuck 31 attached to the main body 4 and opens and closes several jaws 31a of the hydraulic chuck 31. A roller insert holes 32 are provided in the outer circumferential surface at the end of the hydraulic chuck 31 so that the pinch roller 8 can engage the workpiece W.

The rear end of the draw tube 30 spirally engages a piston rod of the hydraulic cylinder 34 which is attached to the main spindle 2 by a hollow shaft 33. A filler tube 35 corresponding to the diameter of the workpiece material W is fitted into the draw tube 30 if required.

On the other hand, a stop 36 for a tool post A of the lathe L is arranged to stop at a position by striking against the end surface of the workpiece material W. In a practical embodiment a hydraulic chuck is employed, but a collet chuck can also be used.

Operation in The Invention

A long workpiece W is inserted into the filler tube 35 which corresponds to the diameter of the said workpiece and the draw tube 30 is displaced together with the piston rod of the hydraulic cylinder 34 towards the left in the direction P by the actuation of said hydraulic cylinder 34 and then the workpiece W is held by several jaws 31a when the hydraulic chuck 31 actuated. Then, by pushing the pin 18 in one tube 10 is rotated around a fulcrum to engage the pinch roller 8 with the workpiece material W. By screwing the adjusting screw 20 in, the pin 17 causes the tube 10 to rotate and also makes the pinch roller 8 engage the workpiece W, whereby the workpiece W is pinched between the said pinch roller 8. The strength with which they pinch the workpiece W is determined by the position of the adjusting screw 20. After pinching the workpiece W between the pinch rollers 8, the main spindle 2 rotates at a low speed in the direction R and, at the same time, the hydraulic cylinder 34 is actuated to displace the draw tube 30 towards the right side in the direction S and opens the respective jaw 31a of the hydraulic chuck 31. Under the foregoing conditions, when compressed air is supplied to the air chamber 24 from the pressure source, the outer tube 23 is displaced by the force of the compressed air towards the right in the direction Q and then the ring plate 29 attached to the end surface of the outer tube 23 engages the driving rollers 12. By the rotation of the main spindle 2 the driving roller 12 is moved in the direction of R together with the main body 4, and because the driving roller 12 is engaged with the ring plate 29 which is attached to the headstock 1 and is fixed, the rotational force of the main spindle 2 causes each driving roller 12 to start to rotate around its own axis within the tube 10 together with the pinch roller 8 which is attached to the shaft 9. When the pinch rollers 8 commence rotation around their own axes, the workpiece W pinched by the pinch rollers 8 is moved out of the hydraulic chuck 31 and is fed in the axial direction S and the end surface thereof engages the stop 36 on the tool post A to fix the position of the workpiece. The stop 36 is provided with a detecting means for detecting engagement of the workpiece W, and therefore, by the signal therefrom, the respective jaws 31a of the hydraulic chuck 31 are closed by the actuation of the hydraulic cylinder 34 to hold the workpiece W. Simultaneously with the foregoing, the pressure source is deactivated the supply of the compressed air to the air chamber 24 is stopped and the air is exhausted. The outer tube 23 is displaced towards the left by the resiliency of the compression springs 27 so that the ring plate 29 does not engage the driving roller 12 and the rotational force of the main spindle is not transmitted to the driving rollers 12. Consequently, the pinch rollers no longer rotate within the tube 10 so that the supply of the workpiece in the axial direction S stops. When the operation on the portion of the workpiece W protruding from the hydraulic chuck 31 is finished and the protruding portion is cut off, the respective jaws 31a of the hydraulic chuck 31 open again and the outer tube 23 is displaced towards the right in the direction Q by the actuation of the compressed air, the ring plate 29 engages the driving rollers 12 and the pinch rollers 8 rotates from the rotational force of the main spindle 2 which is transmitted to the driving rollers 12, and the workpiece W is fed out until it hits the stop 36. From there on, a similar operation to the foregoing is repeated in order to advance the workpiece W.

The amount the workpiece W protrudes from the hydraulic chuck 31 is determined by the position of the stop 36, therefore, it is only necessary to set the tool post A at the desired position.

Figure 4:
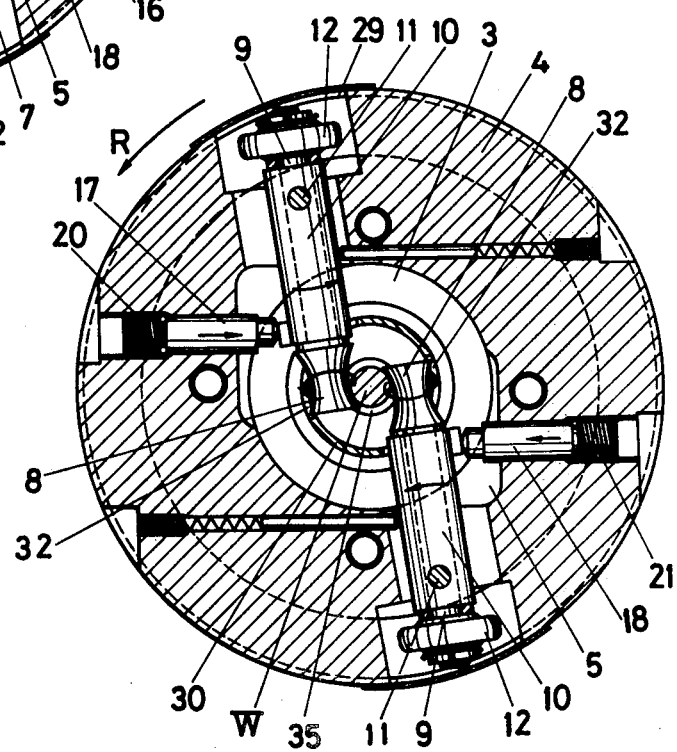
FIG. 4 is a sectional view showing the device in operation.

As shown in FIG. 4, for a workpiece W having a small diameter, the pins 17 and 18 are displaced towards the tubes 10 respectively and, when the said tubes 10 are pivoted to a position which corresponds to the diameter of the workpiece W, the workpiece W is pinched between the pinch rollers 8.

Effectiveness of The Invention

In the present invention, the workpiece is pinched by the pinch rollers having a hyperboloidal shape and the driving rollers are disposed on the same shafts as the pinch rollers, and the pinch rollers and the driving rollers are pivotally supported on the main body and the main body is mounted at the end of the main spindle of the lathe so that it rotates together with the main spindle. Further, there is a ring plate on the outer tube freely displaceable in the axial direction of the main spindle on an inner tube attached to the headstock and this ring plate is engagable with and disengageable from the driving rollers so the driving rollers move together with the rotation of the main spindle and, simultaneously with this, by engaging the ring plate with the driving rollers, the rotation of the main spindle is transmitted to the driving rollers to make the pinch rollers rotate. Thereby the workpiece which is pinched by the pinch rollers is fed in the axial direction. The workpiece is always pinched by the pinch rollers even during the cutting process and, moreover, even with a small diameter of the workpiece, there occurs no vibration because no compressive force acts in the axial direction so that the cutting can be accomplished with the workpiece in the stabilized condition. Consequently, the degree of precision in the cutting would be promoted. When the diameter of the workpiece varies, it is only necessary to shift the rollers by pivoting them pinch rollers by pivoting them and the length of the workpiece material to be supplied can be set by setting the stop. Therefore, there is no restriction on the length of the workpiece which can be fed. Consequently, the amount of the workpiece protruding from the hydraulic chuck for each cutting operation can be freely set without stopping the machine. Moreover, due to the utilization of the rotational force of the main spindle, no exterior feeding machanism is necessary, and therefore the device can be built at a low cost.

What is claimed is:

1. A device for automatically supplying bar stock in a machine tool having a main spindle and a headstock, said device comprising: a main body having an axial hole therethrough and being adapted to be mounted on the main spindle; a pair of pinch roller shaft means pivotally mounted on said main body extending from said axial hole outwardly of the main body and pivotally mounted for movement of the inner ends of the shaft means toward and away from the axis of the main body; pinch rollers mounted on the inner ends of said shaft means with a concave profile for engagement with bar stock extending through the axial hole; drive rollers on the outer ends of said shaft means; and a press plate axially movable relative to said main body for movement into and out of engagement with said drive rollers and being fixed against rotation around said axis, and means for moving said press plate axially; whereby when said press plate is moved into engagement with said drive rollers and said main spindle is rotated, said main body is rotated for rolling said drive rollers along said press plate for rotating said pinch rollers to feed a bar stock pinched by said pinch rollers.

2. A device as claimed in claim 1 in which said shaft means each comprise a hollow tube pivotally mounted on said main body and a shaft rotatable within said tube, and said device further comprises means for pivoting said tubes for moving said pinch rollers toward and away from the axis of said main body for pinching different size bar stock.

3. A device as claimed in claim 2 in which said pivoting means comprises a pair of pins extending through said main body transverse to the axis thereof, one engaging each tube, and means for adjusting the position of said pins in said main body, one of said pins being spring loaded toward the corresponding tube.

* * * * *